(12) United States Patent
Goldman

(10) Patent No.: US 6,840,385 B2
(45) Date of Patent: Jan. 11, 2005

(54) LATERAL DISPERSION FILTER BASKET

(76) Inventor: Sidney Goldman, 11338 Mapletree Ct., Boca Raton, FL (US) 33428

( * ) Notice: Subject to any disclaimer, the term of this patent is extended or adjusted under 35 U.S.C. 154(b) by 207 days.

(21) Appl. No.: 09/739,611

(22) Filed: Dec. 19, 2000

(65) Prior Publication Data

US 2002/0074280 A1 Jun. 20, 2002

(51) Int. Cl.$^7$ .............................................. B01D 29/27
(52) U.S. Cl. .................. 210/456; 210/489; 210/497.01; 55/334; 55/381
(58) Field of Search ................................ 210/474, 452, 210/455, 489, 498, 497.01, 232, 484, 485, 456; 55/334–335, 381–382, 341.1, 380, 364, DIG. 5; 156/308.4, 217–218

(56) References Cited

U.S. PATENT DOCUMENTS

| | | | |
|---|---|---|---|
| 1,380,907 A | * | 6/1921 | Hoover |
| 2,225,389 A | * | 12/1940 | Osterdahl |
| 2,229,838 A | * | 1/1941 | Cover |
| 2,237,499 A | * | 4/1941 | Osterdahl |
| 2,417,000 A | * | 3/1947 | Koenig |
| 2,747,682 A | * | 5/1956 | Gibson |
| 2,961,063 A | * | 11/1960 | Fesco ........................... 55/381 |
| 3,419,151 A | * | 12/1968 | Smith et al. ................. 210/460 |
| 3,524,304 A | * | 8/1970 | Wittemeier et al. |
| 3,724,177 A | * | 4/1973 | Grote .......................... 96/132 |
| 3,931,015 A | * | 1/1976 | Jenkins ....................... 210/232 |
| 4,283,281 A | * | 8/1981 | Cogan ......................... 210/232 |
| 4,496,459 A | * | 1/1985 | Rosaen ....................... 210/130 |
| 4,545,833 A | * | 10/1985 | Tafara |
| 4,775,469 A | * | 10/1988 | Zimmerly .................... 210/237 |
| 4,921,606 A | * | 5/1990 | Goldman ..................... 210/238 |
| 4,986,912 A | * | 1/1991 | Fisch .......................... 210/448 |
| 5,139,672 A | * | 8/1992 | Ohbayashi ................... 210/452 |
| 5,246,581 A | * | 9/1993 | Goldman ..................... 210/452 |
| 5,514,275 A | * | 5/1996 | Morgan, Jr. ................. 210/448 |
| 5,624,559 A | * | 4/1997 | Levin et al. |
| 5,647,881 A | * | 7/1997 | Zhang et al. ................. 55/382 |
| 5,770,077 A | * | 6/1998 | Goldman |
| 5,840,188 A | * | 11/1998 | Kirsgalvis |
| 6,241,899 B1 | * | 6/2001 | Ramos ........................ 210/767 |

* cited by examiner

Primary Examiner—Terry K. Cecil
(74) Attorney, Agent, or Firm—Martin Sachs, P.A.; Martin Sachs

(57) ABSTRACT

A lateral dispersion filter basket provides turbulence at the bottom of the filter basket reducing strain on the bottom seam of the filter bag disposed therein causing the particulate being filtered to move up along the vertical walls of the filter bag.

4 Claims, 2 Drawing Sheets

PRIOR ART

LATERAL DISPERSION FILTER BASKET

BACKGROUND OF THE INVENTION

1. Field of the Invention

The present invention relates to filter baskets, filter bags used therein, in pressurized filter systems, and more particularly, to the construction of the filter basket and bag to improve the life of the filter bag.

2. Discussion of the Relevant Art

The prior art discloses devices used in pressurized continuously operated filter systems, such as that disclosed in U.S. Pat. No. 5,624,559 issued to Levin et al. on Apr. 29, 1997, which a threaded vessel cap that seals the filter bag to a lower body member.

Another apparatus is disclosed in U.S. Pat. No. 5,840,188 issued to Kirsgalvis on Nov. 24, 1998, which utilizes a bulbous lip, that frictionally engages the housing to secure and seal the bag at the housing and basket.

SUMMARY OF THE INVENTION

Therefore it is the primary object of the present invention to overcome the shortcomings of the prior art and provide a solid bottomed hemispherical shaped filter basket and bag to disperse particulate, accumulated from fluid being filtered, upward along the vertical wall of the filter and filter basket, thereby increasing the life of the filter bag.

The foregoing and other objects and advantages will appear from the description to follow. In the description, reference is made to the accompanying drawing, which forms a part hereof, and in which is shown by way of illustration a specific construction and an alternative embodiment in which the invention may be practiced. These apparatuses will be described in sufficient detail to enable those skilled in the art to utilize the invention, and it is to be understood that other embodiments may be utilized and that structural changes may be made without departing from the scope of the invention. The following detailed method and description is, therefore, not to be taken in a limiting sense, and the scope of the present invention is best defined by the appended claims.

The subject matter, regarded as the invention, is particularly pointed out and distinctly claimed at the concluding portion of the specification. The invention, itself, as to its construction, together with further objects and advantages thereof, may best be understood by reference of the following description taken in connection with the accompanying drawing.

BRIEF DESCRIPTION OF THE DRAWING

In order that the invention may be more fully understood, it will now be described, by way of example, with reference to accompanying drawing in which.

DESCRIPTION OF THE PREFERRED EMBODIMENT

Applicant hereby incorporates U.S. Pat. No. 5,246,581, issued May 21, 1993 and U.S. Pat. No. 5,770,077 issued Jun. 23, 1998, to Sidney Goldman as hereinbefore set forth at length.

Figure 1:
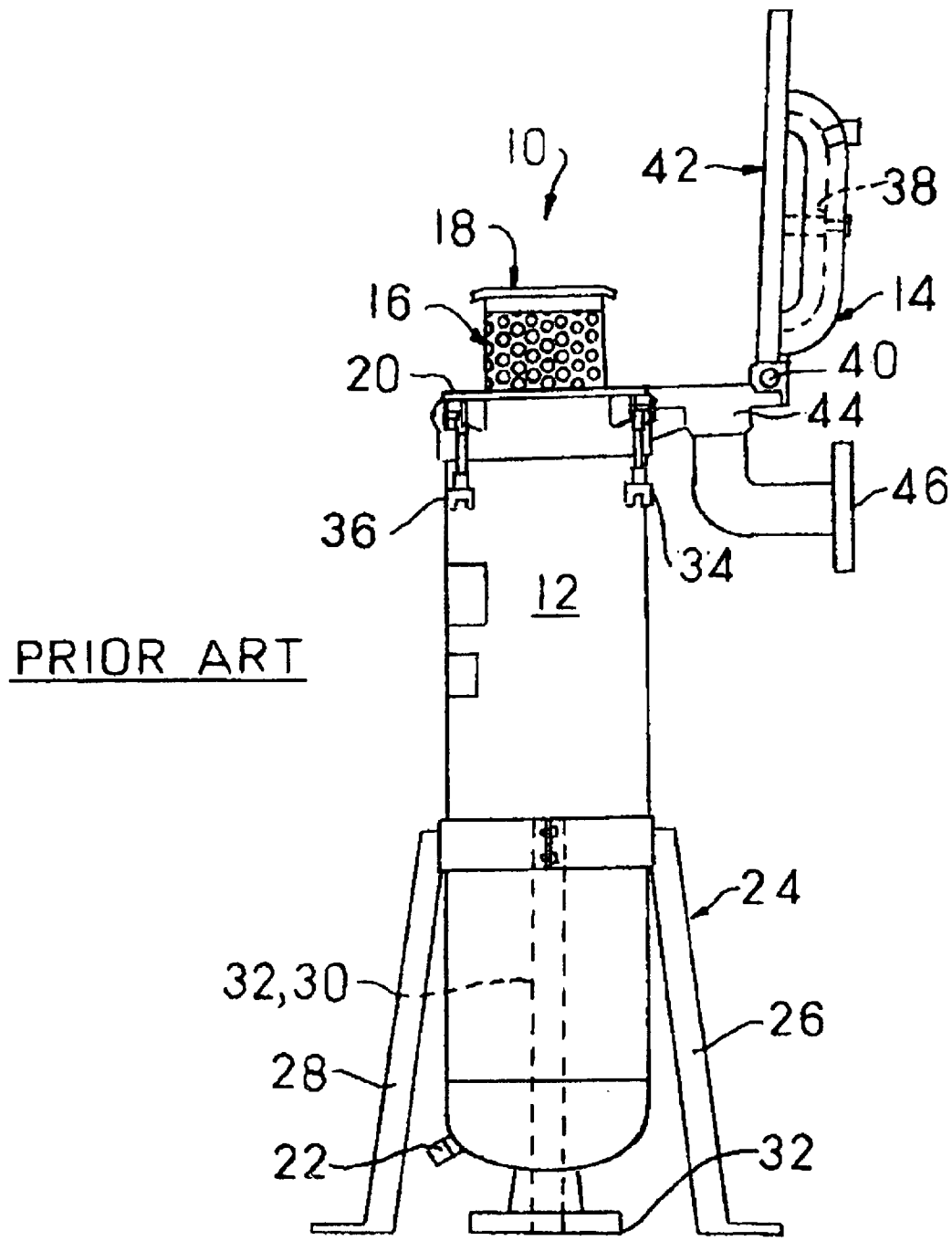
FIG. 1 is a pictorial side view, in elevation of a pressurized filter vessel of the prior art, with its top cover open and a filter basket and filter bag extending upwardly therefrom, according to the principals of the present invention.

Referring now to the figures, and in particular to FIG. 1, wherein there is shown, a prior art pressurized filter vessel 10 that includes a filter housing 12 and a filter basket 16 into which is inserted a inverted filter bag 18, in a conventional manner.

The open or top end 20 of the filter vessel 12 is provided with a sealing cover 42 having a handle 14 affixed thereon. A plurality of conventional clamping mechanisms 34 and 36 serve to hold the cover 42 thereon, in a conventional manner.

The cover 42 is shown in the open position and is hingedly affixed to said filter housing 12 by a pivot pin 40 provided on an extending lip portion 44 disposed proximate the filter vessel opening 20 The handle 14, disposed on the cover 20, assists in raising the cover 20 to the open position.

The inlet port 46 to the housing 12, in the preferred embodiment, communicates with the aperture 38 provided in the cover 42 so that the input fluid to be filtered flows over the top of the filter bag 16 and the filter basket 18 when entering the filter vessel housing 12. The outlet port 22 is provided proximate the lower or closed portion of the filter vessel housing 12, preferably below the hollow solid bottom 19 of the filter basket 16.

An inlet control valve, not shown, is disposed in series with the filter vessel input port 46 and it is connected to the main fluid line, not shown, in which the unfiltered fluid flows. An outlet control valve, not shown, is disposed in series with the filter vessel output port 22 and it is connected to the main filtered fluid line 46, not shown, in which the filtered fluid flows. The filter vessel housing 12 is maintained in an upright or vertical position by a base member 24, which includes legs 26, 28, 30, and 32.

Figure 2:
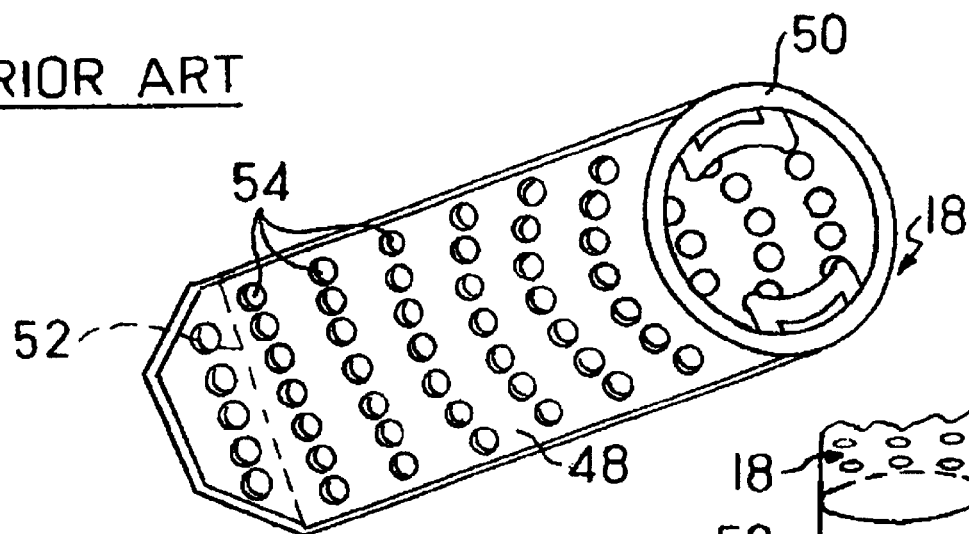
FIG. 2 is a perspective view of a prior art laminated filter bag having heat formed outwardly extending seams, including a ring portion, which has been attached thereon with heat techniques.

Referring now to FIG. 2, which is a perspective view of a prior art multi-layered heat laminated filter bag 18, that may be fabricated from a plurality of different porosity filter materials 48 and affixed to a sealing ring portion 50, which has been attached with heat welding techniques. Disposed along the length and width of the bag 18 are a plurality of heat laminated junctures 54 that improve the strength of the laminated materials 48 and, which may vary in size and quantity depending upon the particulate to be captured (filtered from the fluid).

Figure 3:
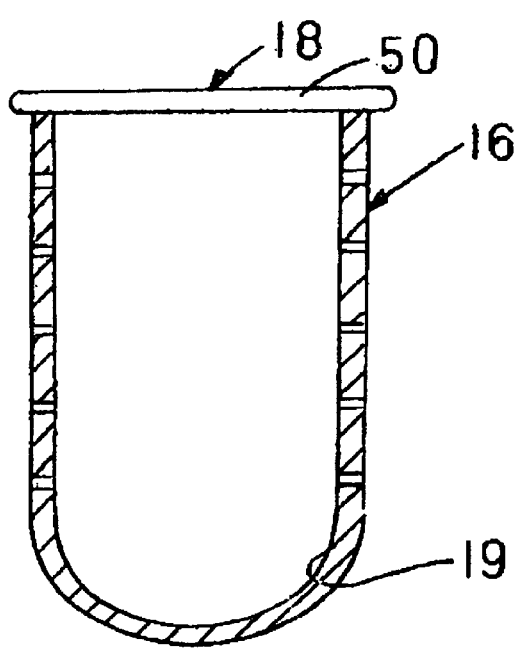
FIG. 3 is a cross-sectional view of a filter basket having a hollow solid bottom and circumferentially perforated walls, into which a filter bag is inserted.
Figure 4:
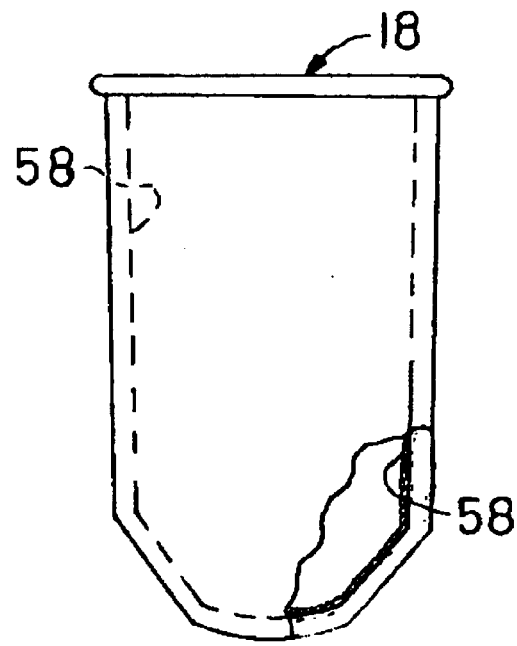
FIG. 4 is a side view in elevation of an inverted filter bag, partially broken away to show the seams thereon facing inwardly.

Referring now to FIG. 3, which is a cross-sectional view of a filter basket 16 showing its hollow solid bottom 19 and perforated vertical walls, that permit the filtered liquid to flow therethrough. The inverted filter 18 bag is adapted to be received into the filter basket 16 in a conventional manner;

Referring now to FIG. 4, it can be seen that the construction of the filter basket 16 is different than that known in the prior art, since its bottom portion 19, instead of being fabricated from perforated or screened material just as the vertical side walls (circumference), it is fabricated from a hollow solid hemispherical material (no openings therein). This type of construction will provide turbulence at the bottom portion of the filter bag 18 and filter basket 16. The particulate being filtered out of the fluid will be caused to move up the vertical wall as the filtered fluid exits, via the openings (apertures) provided in the vertical wall of the basket 16, since the fluid will takes the path of least resistance to exit the filter basket, thereby removing the strain on the bottom heat formed seams of the filter bag 18.

Referring now to FIG. 4, which shows a side view in elevation of an inverted filter bag 18, partially broken away to show the disposition of the seams 58 thereon facing inwardly.

Figure 5:
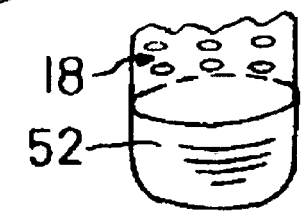
FIG. 5 is a partial pictorial representation of an alternative embodiment of a hollow solid bottom member that may be affixed on the bottom of a filter bag, attached thereto or inserted in the bottom of a conventional filter basket.

Referring now to FIG. 5, in the alternative embodiment, it can be seen that the construction of the filter bag 18 is different than that known in the prior art, since its bottom portion 52, instead of being fabricated from filter material just as the rest of the filter bag 18, it is fabricated from the hollow hemispherical solid (no openings therein) member 52 affixed to the filter material 48. Alternatively, the hollow hemispherical solid material 52 may be inserted into the bottom of a conventional filter bag or basket In operation, the inverted filter bag 18 inserted into the filter basket 16, which is placed into the filter vessel housing 12 and the cover 42 is closed and sealed by the cover clamping mechanisms 34 and 36.

Hereinbefore has been disclosed an apparatus and method for improving the life and reliability of filter bags used in pressurized filter systems. It will be understood that various changes in the method detail, materials, arrangements of parts and operating conditions, which have been herein described and illustrated in order to explain the nature of the invention may be made by those skilled in the art within the principles and scope of the instant invention.

Having thus set forth the nature of the invention, what is claimed is:

1. In a pressurized filter system for filtering fluids, wherein the fluid to be filtered flows under pressure through an input port of a filter vessel housing, having a filter basket adapted to be received by said filter vessel housing and a filter bag adapted to be inserted into said filter basket, said fluid flowing out of an output port disposed proximate a bottom of said filter vessel, each of said basket and said bag having perforated vertical walls and a perforated bottom portion, the improvement comprising:

(a) a hollow, imperforate, hemispherically-shaped insert having an open end, said insert being fabricated from solid material free of apertures and disposed within said filter basket adjacent said basket bottom portion with said open end extending upwardly, wherein the insert is configured to cause turbulence at the bottom portion of the filter basket to reduce strain on a bottom seam of the filter bag and causing particulate being filtered to move up along the vertical walls of the filter bag.

2. A pressurized filter system, according to claim 1, wherein said filter bag includes heat welded seams, said seams being inserted into said filter basket in an inverted manner so that said seams extend inwardly.

3. In a filter system for filtering fluids, wherein the fluid to be filtered flows under pressure through, an input port of a filter vessel housing, having a filter basket adapted to be received by said filter vessel housing and a filter bag adapted to be inserted into said filter basket, said fluid flowing out of an output port disposed proximate the bottom of said filter vessel, the improvement comprising:

(a) said filter basket is fabricated with circumferentially extending vertical walls and a bottom having a plurality of apertures disposed through out;

(b) a hollow, imperforate, hemispherically-shaped insert having an open end, said insert being fabricated from a hollow solid material free of apertures disposed, with its open end extending upwardly, at the bottom of said filter basket; and (c) said filter bag having heat-welded seams, said seams being inserted into said filter basket in an inverted manner so that said seams extend inwardly, wherein the insert is configured to cause turbulence at the bottom of the filter basket to reduce strain on a bottom heat-welded seam of the filter bag and causing particulate being filtered to move up along the vertical walls of the filter bag.

4. In a pressurized filter system for filtering fluids, wherein the fluid to be filtered flows under pressure through a top input port of a filter vessel housing, having a filter basket adapted to be received by said filter vessel housing and a filter bag adapted to be inserted into said filter basket, said fluid flowing out of a bottom output port disposed proximate a bottom of said filter vessel, each of said basket and said bag having perforated vertical walls and a perforated bottom portion, the improvement comprising:

(a) a hollow, imperforate, hemispherically-shaped insert having an open end, said insert being fabricated from solid material free of apertures and disposed within said filter basket adjacent said basket bottom portion with said open end extending upwardly, wherein the insert is configured to cause turbulence at the bottom portion of the filter basket to reduce strain on a bottom seam of the filter bag and causing particulate being filtered to move up along the vertical walls of the filter bag.

* * * * *